Patented Jan. 12, 1954

2,666,057

UNITED STATES PATENT OFFICE 2,666,057

SUBSTITUTED THIOBARBITURIC ACIDS AND SALTS THEREOF

Wilbur J. Doran, Indianapolis, Ind., assignor to Eli Lilly and Company, Indianapolis, Ind., a corporation of Indiana No Drawing. Application April 4, 1952, Serial No. 280,653

6 Claims. (Cl. 260—260)

This invention relates to barbituric acids and more particularly to certain 5,5-disubstituted 1-methyl-2-thiobarbituric acids and salts thereof, and their preparation.

The compounds of the present invention may be represented by the formula

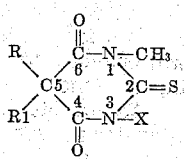

wherein R represents a member of the group consisting of the ethyl and allyl radicals, and $R_1$ is a member of the group consisting of the 1-methylbutyl and 1-ethylpropyl radicals, and X represents hydrogen when the compound is an acid, and represents a metallic or metallic-like radical when the compound is a salt.

The 5,5-disubstituted 1-methyl-2-thiobarbituric acids of this invention are white, crystalline solids which are insoluble in water and soluble in the common organic solvents. The salts of the new substituted 1-methyl-2-thiobarbituric acids are solids which are generally soluble in water and alcohol, and insoluble in most organic solvents. The new compounds have utility as hypnotics and anesthetics, and are particularly valuable in that they are characterized by an unusually short hypnotic action. Compounds with extremely short action such as is displayed by the compounds of this invention have long been sought, since they would be especially useful in connection with minor surgical measures.

The substituted 1 - methyl - 2 - thiobarbituric acids can be prepared by alternative procedures. Thus, for example, a diester of an appropriately substituted malonic acid can be condensed with N-methylthiourea in the presence of an alkaline catalyst such as sodium ethoxide or the like, to form the desired substituted 1-methyl-2-thiobarbituric acid. Alternatively, an appropriately substituted cyanoacetic ester can be condensed with N-methylthiourea to form the correspondingly substituted imino-2-thiobarbituric acid, which is then hydrolyzed with a mineral acid to remove the imino group and produce the desired 1-methyl-2-thiobarbituric acid.

Salts of the thiobarbituric acids of this invention are readily prepared by the usual methods of the art, as, for example, by interreaction of stoichiometrically equivalent quantities of the selected acid and a base containing the desired metallic or metallic-like (i. e., substituted ammonium) cation, in a mutual solvent, followed by removal of the solvent to leave the salt as a residue. The preferred salts are the pharmaceutically useful salts, i. e. salts which are not substantially more toxic than the acids from which they are derived, and which can be incorporated in pharmaceutical extending media, liquid or solid, for the preparation of therapeutically useful compositions. Illustrative examples of suitable salts include those of the alkali metals, e. g. sodium and potassium, alkaline earth metals, e. g. calcium, and substituted ammonium radicals, e. g. ethanolamine, ethylenediamine, tetraalkyl ammonium hydroxide, and the like.

The following examples more specifically illustrate the preparation of the substituted 1-methyl-2-thiobarbituric acids of the invention, and their salts.

EXAMPLE 1

*Preparation of 1-methyl-5-ethyl-5-(1'-methylbutyl)-2-thiobarbituric acid*

To a solution of 38 g. (1.65 mols) of sodium in 760 cc. of absolute alcohol are added 350 g. (1.65 mols) of the ethyl ester of ethyl-(1-methylbutyl)-cyanoacetic acid [prepared as described by Tabern et al., J. A. C. S., 56, 1939 (1934)], and 135 g. (1.5 mols) of methylthiourea. The mixture is refluxed for about 24 hours, and the resulting reaction mixture, containing 1-methyl-5 - ethyl - 5 - (1' - methylbutyl) - 4 - imino-2-thiobarbituric acid formed in the reaction is cooled and poured over about 500 g. of solid carbon dioxide contained in a large beaker. After the carbon dioxide has substantially completely reacted, 2 liters of water are added to the mixture and the oil that separates is extracted with 3 successive 500 cc. portions of ether. The combined ether extracts are extracted with two 750 cc. portions of 5 percent aqueous sodium hydroxide, and the combined alkaline extracts containing the sodium salt of the imino-2-thiobarbituric acid are acidified with dilute acetic acid whereupon 1-methyl-5-ethyl-5-(1'-methylbutyl)-4-imino-2-thiobarbituric acid precipitates as an oil which solidifies on standing. The solid substance is filtered off, washed with water, and recrystallized from aqueous ethanol.

25.5 g. (0.1 mol) of 1-methyl-5-ethyl-5-(1'-methylbutyl)-4-imino-2-thiobarbituric acid prepared according to the foregoing procedure and melting at about 105–108° C., are mixed with a solution of 10 cc. (0.12 mol) of concentrated hydrochloric acid in 250 cc. of water. The mixture is refluxed with stirring for about one hour whereupon an oil comprising 1-methyl-5-ethyl-5-(1'-methylbutyl)-2-thiobarbituric acid separates. The oily layer solidifies on cooling and is filtered off, washed with water and recrystallized from aqueous ethanol.

1 - methyl - 5 - ethyl - 5 - (1' - methylbutyl) - 2-thiobarbituric acid thus prepared melted at about 55–58° C.

*Analysis.*—Calculated for $C_{12}H_{20}N_2O_2S$: N, 10.93. Found: N, 10.70.

EXAMPLE 2

*Preparation of the sodium salt of 1-methyl-5-ethyl-5-(1'-methylbutyl)-2-thiobarbituric acid*

25 g. of 1-methyl-5-ethyl-5-(1'-methylbutyl)-2-thiobarbituric acid are dissolved in 100 cc. of absolute ethanol and to the resulting solution is added gradually and with stirring an ethanol solution of sodium ethylate until the pH of the mixture is about 11.3. The reaction mixture is then evaporated to dryness in vacuo and the residue, consisting of sodium salt of 1-methyl-5-ethyl-5-(1'-methylbutyl)-2-thiobarbituric acid, is dried in a vacuum oven.

The potassium, calcium and ethanolamine salts are prepared in a similar manner, except that in the preparation of the substituted ammonium salts, care should be taken not to heat the salts to any appreciable degree during the drying operation, to avoid loss of the volatile ammonium base.

EXAMPLE 3

*Preparation of 1-methyl-5-ethyl-5-(1'-ethylpropyl)-2-thiobarbituric acid*

The procedure of Example 1 is followed, except that the ethyl ester of ethyl-(1-ethylpropyl)-cyanoacetic acid [prepared by the method of Tabern et al., J. A. C. S.: 56, 1939 (1934)] is used. The intermediate 1-methyl-5-ethyl-5-(1'-ethylpropyl-4-imino-2-thiobarbituric acid which is formed, is hydrolyzed to yield 1-methyl-5-ethyl-5-(1'-ethylpropyl)-2-thiobarbituric acid, which when recrystallized from aqueous ethanol melts at about 57–61° C.

EXAMPLE 4

*Preparation of 1-methyl-5-allyl-5-(1'-methylbutyl)-2-thiobarbituric acid*

The procedure of Example 1 is followed, except that ethyl allyl-(1-methylbutyl)-cyanoacetate, prepared by the method described in British Patent 613,704, granted December 2, 1948, is used. The intermediate 1-methyl-5-allyl-5-(1'-methylbutyl)-4-imino-2-thiobarbituric acid which is formed, is hydrolyzed to yield 1-methyl-5-allyl-5-(1'-methylbutyl)-2-thiobarbituric acid, which when recrystallized from aqueous ethanol melts at about 69–70° C.

A solution of 8.4 g. (0.1 mol) potassium ethylate in 20 cc. of absolute ethanol is added to a solution of 22.6 g. (0.1 mol) of 1-methyl-5-allyl-5-(1'-methylbutyl)-2-thiobarbituric acid in 50 cc. of anhydrous ethanol. The resulting mixture is filtered, and the filtrate is evaporated to dryness in vacuo. A white solid, consisting of the potassium salt of 1-methyl-5-allyl-5-(1-methylbutyl)-2-thiobarbituric acid, is recovered.

EXAMPLE 5

*Preparation of 1-methyl-5-allyl-5-(1'-ethylpropyl)-2-thiobarbituric acid*

The procedure of Example 1 is followed, except that ethyl allyl-(1-ethylpropyl)-cyanoacetate, prepared according to the disclosure of British Patent 613,705, granted December 2, 1948, is used. The 1-methyl-5-allyl-5-(1'-ethylpropyl)-4-imino-2-thiobarbituric acid which is formed as an intermediate in the process is hydrolyzed to yield 1-methyl-5-allyl-5-(1'-ethylpropyl)-2-thiobarbituric acid, which melts at about 53–57° C. after recrystallization from dilute ethanol.

EXAMPLE 6

The compounds of the present invention can also be prepared by the process wherein a suitably substituted malonic ester is condensed with methylthiourea. The following description, in which the preparation of 1-methyl-5-ethyl-5-(1'-methylbutyl)-2-thiobarbituric acid is specifically illustrated, exemplifies the preparation of the new substituted thiobarbituric acids.

11.5 g. (0.5 mol) of sodium are dissolved in 200 cc. of absolute alcohol. To the solution are added 36 g. (0.4 mol) of methylthiourea and 112 g. (0.4 mol) of ethyl (1-methylbutyl) ethyl malonate and the mixture is refluxed for 20 hours. The reaction mixture is cooled and poured over an excess of Dry Ice. The mixture is allowed to stand until about pH 7 in reaction, as shown by indicator paper. 700 cc. of water are then added and the resulting oily mixture is extracted with three successive 250 cc. portions of ether. The combined ether extracts are extracted twice with 250 cc. portions of 5 percent sodium hydroxide solution. The combined alkaline extracts are cooled and neutralized with dilute acetic acid, and the 1-methyl-5-ethyl-5-(1'-methylbutyl)-2-thiobarbituric acid formed in the reaction separates as an oil. The oily mixture is extracted with 3 successive 200 cc. portions of ether, the combined ether extracts are dried and the ether distilled off. The residue is fractionally distilled under reduced pressure and the portion boiling at about 150–152° at 2 mm. pressure is collected.

The 1-methyl-5-ethyl-5-(1'-methylbutyl)-2-thiobarbituric acid thus prepared was found to melt at about 54–57° C. after recrystallization from aqueous ethanol.

I claim:

1. A compound chosen from the group consisting of thiobarbituric acids represented by the formula

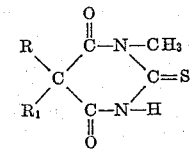

wherein R is a member of the group consisting of ethyl and allyl radicals and $R_1$ is a member of the group consisting of 1-ethylpropyl and 1-methylbutyl radicals; and their pharmaceutically useful salts.

2. 1-methyl-5-ethyl-5-(1'-methylbutyl)-2-thiobarbituric acid.

3. 1-methyl-5-ethyl-5-(1'-ethylpropyl)-2-thiobarbituric acid.

4. 1-methyl-5-allyl-5-(1'-methylbutyl)-2-thiobarbituric acid.

5. 1-methyl-5-allyl-5-(1'-ethylpropyl)-2-thiobarbituric acid.

6. Sodium 1-methyl-5-ethyl-5-(1'-methylbutyl)-2-thiobarbituric acid.

WILBUR J. DORAN.

References Cited in the file of this patent

UNITED STATES PATENTS

| Number | Name | Date |
|---|---|---|
| 2,152,512 | Volweiler et al. | Mar. 28, 1939 |
| 2,187,728 | Christiansen | Jan. 23, 1940 |

OTHER REFERENCES

Crossley et al.: J. Org. Chem. 5, 238–243 (1940).

Volweiler et al.: J. Am. Chem. Soc., 57, 1961–3 (1935).